United States Patent [19]
Uriu et al.

[11] Patent Number: 5,345,451
[45] Date of Patent: Sep. 6, 1994

[54] CYCLIC REDUNDANCY CHECK OPERATING METHOD AND A HEAD ERROR CHECKER SYNCHRONIZING UNIT IN AN ASYNCHRONOUS TRANSFER MODE SWITCHING PROCESS

[75] Inventors: Shiro Uriu; Shuji Yoshimura, both of Kawasaki, Japan

[73] Assignee: Fujitsu Limited, Kawasaki, Japan

[21] Appl. No.: 848,170

[22] Filed: Mar. 10, 1992

[30] Foreign Application Priority Data

Mar. 13, 1991 [JP] Japan .................................. 3-048406

[51] Int. Cl.$^5$ ............................................. G06F 11/10
[52] U.S. Cl. ..................................... 371/42; 371/37.7; 371/47.1
[58] Field of Search ................. 371/37.1, 37.7, 42, 371/47.1, 46, 25.1, 24, 67.1, 21.2; 370/105

[56] References Cited

U.S. PATENT DOCUMENTS

| | | | |
|---|---|---|---|
| 4,397,020 | 8/1983 | Howson | 371/37.1 |
| 4,700,350 | 10/1987 | Douglas et al. | 371/37.7 |
| 5,155,487 | 10/1992 | Tanaka et al. | 341/100 |
| 5,230,002 | 7/1993 | Yamashita et al. | 371/37.1 |

FOREIGN PATENT DOCUMENTS

0003480  8/1979  European Pat. Off. .
0396403 11/1990 European Pat. Off. .

OTHER PUBLICATIONS

T. Kitami, "Synchronization Method Employing a Cyclic Redundancy Check in an Asynchronous Transport System", Electronics and Communications in Japan, vol. 73, No. 5, May 1, 1990, New York pp. 99–108.

*Primary Examiner*—Robert W. Beausoliel, Jr.
*Assistant Examiner*—My-Phung Chung
*Attorney, Agent, or Firm*—Staas & Halsey

[57] ABSTRACT

A CRC operating unit which performs a CRC operation on received data using as an initial value a CRC operation result actual value obtained in a previous operation, and outputs a CRC operation result actual value. A delay unit delays the CRC operation result actual value by the time taken for a header part to be entered. The CRC operation result derivation unit outputs as a CRC operation result derivation value an operation result obtained by a CRC operation performed for all the receiving data of a header part provided with the above described CRC code using the CRC operation result actual value as an initial value. The coincidence detecting unit compares the CRC operation result actual value with the CRC operation result derivation value to detect the input timing of a header part as coincident timing for both values.

6 Claims, 12 Drawing Sheets

FIG. 13

|     | INITIAL VALUE | CRC OPERATION RESULT FOR A HEADER PART |
|-----|---------------|----------------------------------------|
| (a) | 00000001      | 01100010                               |
| (b) | 00000010      | 11000100                               |
| (c) | 00000100      | 10001111                               |
| (d) | 00001000      | 00011001                               |
| (e) | 00010000      | 00110010                               |
| (f) | 00100000      | 01100100                               |
| (g) | 01000000      | 11001000                               |
| (h) | 10000000      | 10010111                               |

CYCLIC REDUNDANCY CHECK OPERATING METHOD AND A HEAD ERROR CHECKER SYNCHRONIZING UNIT IN AN ASYNCHRONOUS TRANSFER MODE SWITCHING PROCESS

BACKGROUND OF THE INVENTION

The present invention relates to a CRC (Cyclic Redundancy Check) operating method for performing a CRC operation on an encoded word and to an HEC (Head Error Checker) synchronizing unit for detecting an error in a header of a cell and synchronizing a cell in an ATM switching method.

A typical method of detecting and correcting an error in data used in a data process or data communication, etc., is a cyclic redundancy check (hereinafter referred to as a CRC). This is a checking method based on the fact that an encoded polynomial containing a cyclic code (cyclic replacement of any encoded word results in another encoded word) can be divided by a generated polynomial.

For example, when data are encoded, they are segmented in predetermined length units. Next, a CRC code can be obtained as a polynomial code indicating a remainder of a division by dividing by mod (modulo) 2 and by an appropriately generated polynomial in the binary representation comprising predetermined length data to be processed. Then, the CRC code is applied to the original data to be processed. An encoded polynomial comprising an encoded word necessarily comprises a cyclic code divided by the above described generated polynomial.

When an encoded word formed by adding a CRC code is decoded, it is segmented in the same length units as in the encoding process. Then, a CRC operation is performed in which the encoded polynomial comprising encoded words of predetermined length is divided by the same generated polynomial as that used in the encoding process. If the remainder is "0", it means that no errors have arisen in the encoded word from the encoding process to the decoding process. However, a remainder other than "0" means an error has arisen.

An example of a circuit using a CRC operation is an HEC synchronizing circuit in an ATM switching method.

In an ATM (Asynchronous Transfer Mode) switching method, communication data are divided into fixed lengths of 53 bytes. Then, each cell is transmitted after being multiplexed to the time slots in the transmission line. A large-capacity, high-speed communication network can thus be realized by autonomously switching the cell with a hardware switch according to the destination information added at the header part of each cell.

FIG. 1 shows the general configuration of an ATM switching unit. Each cell is transmitted via a large capacity ATM transmission line (optical transmission line) 101 at a transmission speed of 600 Mbps (megabits/second), for example. Each transmission line 101 is terminated by a transmission line terminal unit 102, multiplexed by a multiplexer (MUX) 103 and then switched by an ATM switch 104.

In the transmission line 101, each cell is multiplexed as shown by (a) of FIG. 2 to a predetermined 53-byte time slot and transmitted in the direction indicated by the arrow shown by (a) of FIG. 2. Each cell comprises a header part containing its destination information, etc., and an information part containing communication information.

In a MUX 103 shown in FIG. 1, a multiplexed cell is re-multiplexed to a plurality of transmission lines after being inputted from each ATM transmission line 101. Therefore, the cell input timing through the ATM transmission line 101 must be exactly synchronized. The synchronizing operation is realized as an operation by a transmission line terminal unit 102 of detecting the head of a cell header applied through each of the ATM transmission lines 101.

FIG. 3 shows the general configuration of each of the transmission line terminal units 102 for realizing the above described synchronizing operation. An HEC (described later) synchronizing circuit 301 detects the input timing of the header part of a cell 304 inputted from the transmission line 101. A cell synchronization determining circuit 302 determines the stable input timing of a cell by detecting in the HEC synchronizing circuit 301 the repetition of the input timing of a header part of a plurality of cells 304. Then, the circuit 302 outputs a cell synchronizing pulse 305 as shown in FIG. 2. According to a cell synchronizing pulse 305, a cell 304 temporarily stored by a delay circuit 303 is outputted toward the MUX 103 shown in FIG. 1 according to the timing shown in (a) and (b) of FIG. 9. In the MUX 103 shown in FIG. 1, each of the cells 304 transmitted from each of the transmission line terminal units 102 is multiplexed according to the cell synchronizing pulse 305 provided by each of the transmission line terminal units 102.

A header part of a cell comprises 5-byte data, the last byte of which is called an HEC (Header Error Checker). The HEC is a CRC code added to 4-byte data transmitted as destination information on the sending side. That is, on the sending side, a one-byte CRC code can be obtained as a remainder of a division by dividing a polynomial in the binary representation comprising the above described 4-byte data to be transmitted by the generated polynomial $x^8+x^2+x+1$. The 5-byte data of a header part of a sending cell can be generated by adding the CRC code to the 4-byte data to be transmitted.

On the receiving side, in response to the generation of a sending header part, the HEC synchronizing circuit 301 (FIG. 3) sequentially retrieves 5-serial-byte data by moving each of their positions forward by one byte each. Then, a CRC operation is performed such that a binary polynomial comprising 5-byte-data to be received is divided by the generated polynomial used on the sending side. As indicated by the principle of the above described CRC operation, the remainder of the division in which a 5-byte coded-word polynomial is divided by a generated polynomial used on the sending side must be "0" if the 5-byte data of a header part are correctly extracted on the receiving side. The HEC synchronizing circuit 301 must detect as current input timing of an errorfree header part of a cell 304 (FIG. 3) the input timing of 5-byte data to be received when a remainder "0" is obtained in the above described CRC operation. That is, the HEC synchronizing circuit 301 detects the input timing of a header part and simultaneously detects errors therein.

FIG. 4 shows a configuration sample of the prior art technology of the HEC synchronizing circuit for realizing the detecting operation for a header part.

As described above, the HEC synchronizing circuit 301 must sequentially retrieve 5-serial-byte data by moving each of their positions forward by one byte each. Then, a CRC operation is performed such that a binary polynomial comprising 5-byte-data to be received is divided by the generated polynomial used on the sending side. In this case, the data is sequentially received in a byte unit, stored in a flip-flop (FF) $402_0$, sequentially shifted in a byte unit in $FF402_1$-$FF402_4$, and 5-byte receiving data are retrieved as the output of $FF402_0$-$402_4$. Each of the FFs stores data in a byte unit. Conventionally, five CRC operating circuits CRCCs $401_1$-$401_5$ for performing a byte-by-byte CRC operation are connected in serial. In each CRCC 401, a CRC operation is performed such that each byte in the 5-byte data is divided by a generated polynomial $x^8+x^2+x+1$. In this case, an operation result obtained by the operation in the previous CRCC 401 (the remainder after dividing each byte datum by a generated polynomial) is provided to the next CRCC 401. The all "0" data are applied as an initial value to the first CRCC 401.

FIG. 5 shows the circuit configurations of each of the CRCCs $401_1$-$401_5$ shown in FIG. 4. In FIG. 5, $a_0$-$a_7$ are received data outputted from the FF 402, $b_0$-$b_7$ are results of the CRC operation in the previous CRCC 401, and $c_0$-$c_7$ are results of the CRC operation in the present CRCC 401. $a_7$, $b_7$, and $c_7$ are MSBs, that is, the most significant bits, and $a_0$, $b_0$, and $c_0$ are LSBs, that is, the least significant bits. The circuit configuration shown in FIG. 5 is well-known for performing a CRC operation and comprises a combination of exclusive logical sum (EOR) elements.

However, as indicated in FIG. 4, the conventional HEC synchronizing circuit requires five serially connected CRC operating circuits (CRCC) $401_1$-$401_5$, and the hardware is configured in a large scale. Specifically, in the ATM switching method, the hardware must be configured in the smallest possible scale because 1-byte data are processed at a very high clock speed of 18.75–75 MHz.

The above described problem is not limited to an HEC synchronizing circuit in an ATM switching method, but also occurs in a CRC operating unit for sequentially performing a CRC operation to detect the segmentation of data containing a CRC code and for detecting errors in the data.

SUMMARY OF THE INVENTION

The present invention has been developed based on the above described background, and an object of the present invention is to realize a CRC operation in small scale hardware.

In the prior art technology, the number of serially connected CRC operating circuits must correspond to the data length of a header part. By contrast, in the present invention, a CRC operation for conducting the HEC synchronization can be realized only by one CRC operating unit and one CRC operation result derivation unit. Taking a coset into account according to the CCITT (International Telegraph and Telephone Consultative Committee) recommendations, the hardware can be configured in a smaller scale than in the prior art technology.

BRIEF DESCRIPTION OF THE DRAWINGS

Other objects and features of the present invention can be easily recognized by referring to the attached drawings and the description of the preferred embodiment of the present invention, FIG. 1 (PRIOR ART) shows the configuration of the ATM switching unit comprising the HEC synchronizing circuit;

FIG. 13 shows a view for showing for each initial value an operation result obtained in a CRC operation performed on a header part using an initial value having only one value "1" in its 8 bits.

DESCRIPTION OF THE PREFERRED EMBODIMENTS

Explanation of the Principle

Figure 6:
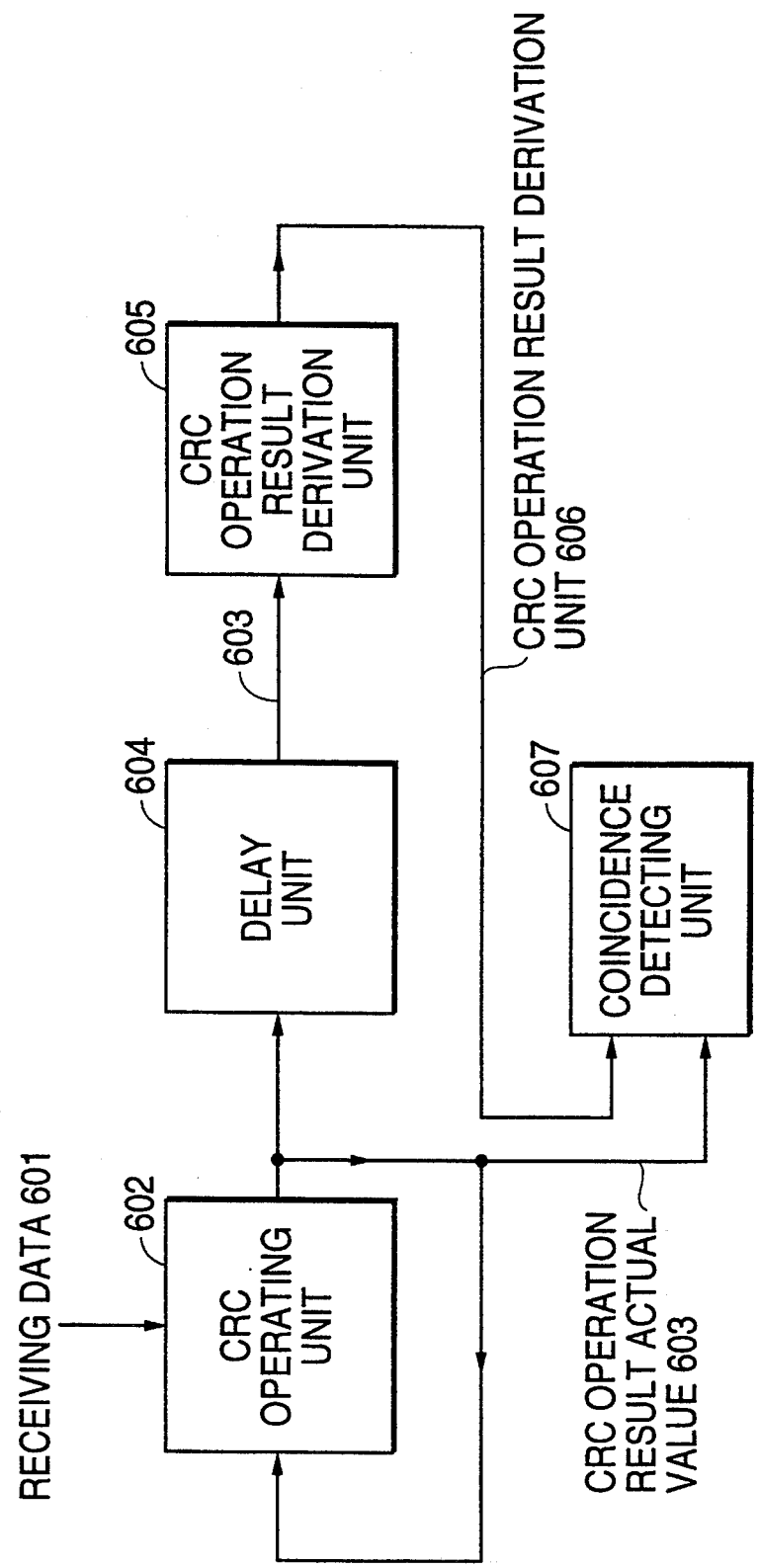
FIG. 6 is a block diagram for explaining the principle of the present invention.

FIG. 6 is a block diagram for explaining the principle of the present invention, and shows an HEC synchronizing unit for detecting errors in the header part of a cell in the asynchronous transfer mode (ATM) switching method and for performing a cell synchronizing operation.

A CRC operating unit 602 performs a cyclic redundancy check (CRC) in which received data 601 are divided by a predetermined generated polynomial with a CRC operation result actual value 603 obtained in the previous operation as an initial value in response to received data 601 applied in a byte unit. Then, it outputs the CRC operation result actual value 603 as a remainder.

A delay unit 604 delays the output of the CRC operation result actual value 603 by the time in which a header part of the received data 601 takes to be inputted.

A CRC operation result derivation unit 605 outputs a value as a CRC operation result derivation value 606 as if it were obtained as a result of a CRC operation performed for all the receiving data of a header part including a CRC code of the length of the above described header part using as an initial value the CRC operation result actual value 603 outputted by the delay unit 604. The unit 605 comprises a plurality of logical circuits for outputting a value as a CRC operation result derivation value 606 as if it were obtained as a result of a CRC operation performed for all the receiving data of a header part including a CRC code of the length of the above described header part using an initial value having one bit value different from the values of the other bits. Each logical circuit is provided for each initial value having a different value bit placed at a different position. Each of the logical circuits is connected such that the CRC operation result derivation value 606 can be obtained as an exclusive logical sum of output values of the logical circuits each corresponding to an initial value having a different value at a different bit position.

A coincidence detecting unit 607 compares the CRC operation result actual value 603 outputted by the CRC operating unit 602 with the CRC operation result derivation value 606 outputted by the CRC operation result derivation unit 605. It then detects the input timing of received data containing no errors in the header part provided with a CRC code.

The above described configuration of the present invention relates to an HEC synchronizing unit in the ATM switching method. However, the present invention is not limited to this application, but can be used to detect the segmentation of data containing a CRC code by sequentially performing a CRC operation for detecting errors in data.

In the present invention, when a CRC operation is performed for a header part containing a CRC code (the header part can comprise common data to be processed) and when an initial value does not comprise all "0s" but may have other bit configurations, the operation result of the CRC operation of the header part takes a unique value in response to the initial value. Thus, the CRC operation result derivation unit 605 (corresponding to the CCR) performs a deriving operation to derive as the CRC operation result derivation value 606 an operation result in response to any initial value.

Based on the above described condition, the CRC operating unit 602 performs a CRC operation for each piece of sequentially received data in a byte unit, and the CRC operation result actual value 603 obtained by each CRC operation is used as the initial value of the next CRC operation.

In the above described configuration, the CRC operation result actual value 603 obtained in the CRC operation performed on the 5th byte (in the HEC portion) of a 5-byte header part is equal to the CRC operation result derivation value 606 derived by the CRC operation result derivation unit 605 using the initial value used when a CRC operation is performed for the byte four bytes before the present one, that is, the first byte of the header part. The initial value is equal to the CRC operation result actual value 603 obtained in the CRC operation performed for the 5 bytes before the present byte.

In the present invention, the delay unit 604 delays the CRC operation result actual value 603 by 5 bytes corresponding to the data length of a header part, for example. Then, the CRC operation result derivation unit 605 derives the CRC operation result derivation value 606 as if it were obtained as a result of a CRC operation performed for the whole 5-byte header using as an initial value the CRC operation result actual value 603 for the data 5 bytes before the present received data 601 (data to be processed) in the present CRC operation. Thus obtained CRC operation result derivation value 606 is compared with the CRC operation result actual value 603, the input timing of receiving data containing no errors in a header part can be detected as the timing indicating "coincidence" between these values, thus establishing the HEC synchronization.

Explanation of the Preferred Embodiment

A preferred embodiment of the present invention is described below in association with the attached drawings.

Figure 1:
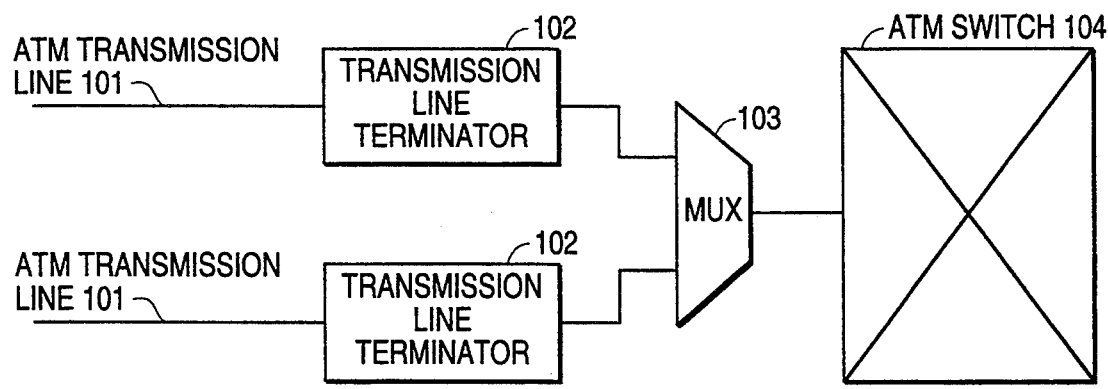
Figure 2:
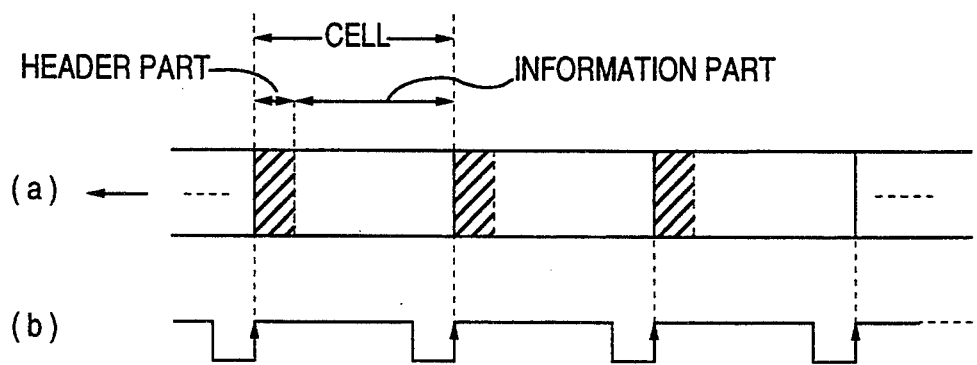
FIG. 2 (PRIOR ART) shows a view for explaining the cell synchronizing operation.

The general configuration of the ATM switching unit related to the preferred embodiment of the present invention is the same as that shown in FIG. 1. The block configuration of a transmission line terminal unit 102 (FIG. 1) for realizing an HEC synchronizing operation is the same as that shown in FIG. 3. The feature of the preferred embodiment described below resides in a practical configuration of the HEC synchronizing circuit 301. Before explaining the configuration, the operational principle of the preferred embodiment is described.

Figure 4:
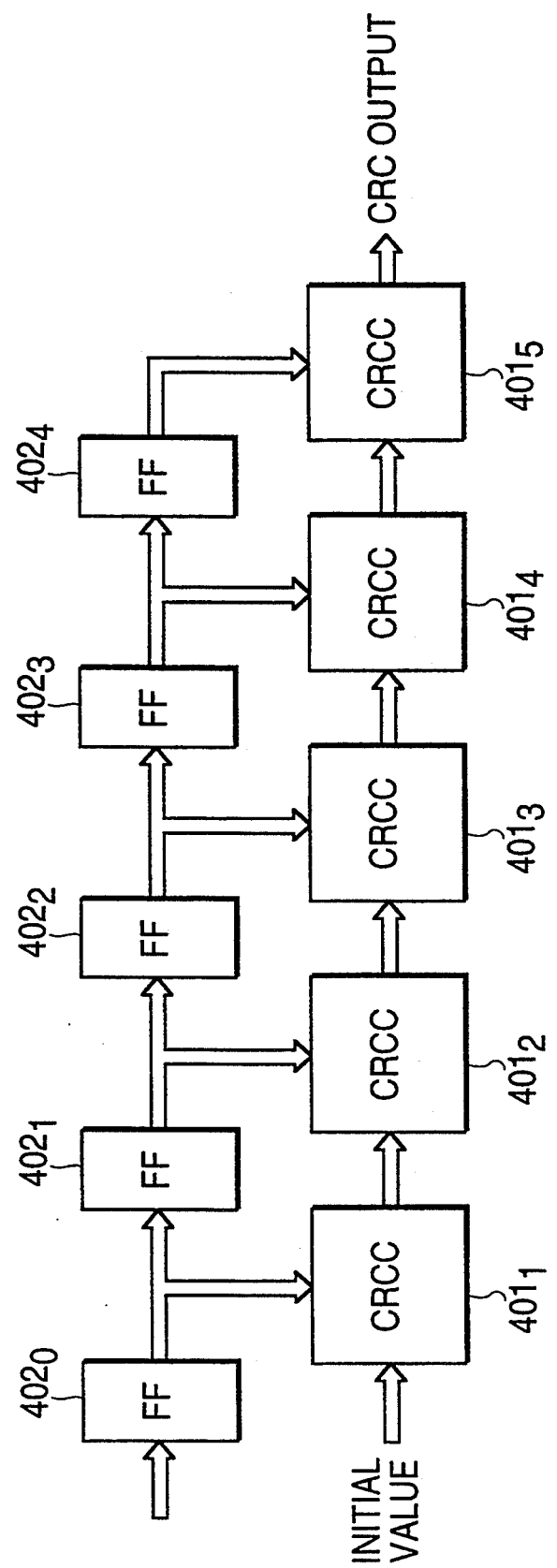
FIG. 4 (PRIOR ART) shows the configuration of the HEC synchronizing circuit of the prior art technology.

In the prior art technology shown in FIG. 4, one-byte data comprising all "0s" are applied as an initial value to the first CRCC 401, and an operation result of a CRC operation in each of the CRCCs 401 is provided to the next CRCC 401. The input timing of a 5-byte header part is detected with the operation result in the 5th CRCC 4015 obtained as "0". Thus, in the prior art technology, since an initial value must be set as all "0s", five CRCCs for performing a CRC operation in a byte unit must be connected, and the hardware is thus configured in a large scale.

By contrast, in the present invention, a result of a CRC operation for a 5-byte header part (a remainder of a division in which the 5-byte data of a header part is divided by a generated polynomial using the above described initial value) is uniquely obtained in response to an initial value when a CRC operation is performed for a 5-byte header part and when an initial value in the operation does not comprise all "0s" but any other initial values.

FIG. 13 shows results of operations in which only one bit in an initial value comprising eight bits, that is, one byte, contains "1" when a CRC operation is performed for a 5-byte header part.

Using FIG. 13, a result of a CRC operation performed for a 5-byte header part can be derived when an initial value can be any value. That is, in any initial value comprising 8 bits, a bit indicating the value "1" is extracted, and an operation result of an initial value having the above described bit as the only bit containing the value "1" is extracted from FIG. 13. A result of a CRC operation performed on a 5-byte header part comprising the above described initial value can be derived as a value sequentially indicating exclusive OR for each bit in each operation result. For example, when an 8-bit initial value is "00100101", the 0-th, 2nd, and 5th bits indicate "1". Therefore, a result of a CRC operation for a 5-byte header part can be derived as the value "10001001" obtained by sequentially calculating an exclusive logical sum for each bit of the operation results "01100010", "10001111", and "01100100" obtained in (a), (c), and (f) in FIG. 13.

The present preferred embodiment is based on the above described fact. That is, a CRC operation is performed on each piece of sequentially received 1-byte data, and a result obtained in each CRC operation is used as the initial value of the next CRC operation. In this configuration, the result obtained in the CRC operation performed for the 5th byte of a 5-byte header part (an HEC portion) is equal to the operation result derived according to FIG. 13 for the initial value used when a CRC operation is performed on the byte four bytes before the present one, that is, the first byte of the header part. The initial value is equal to the result of the CRC operation for the byte 5 bytes before the present one. In the present preferred embodiment, a circuit is provided to derive a value as if it were obtained as a result of a CRC operation performed for a 5-byte header part using as an initial value the result of the CRC operation for the data which is 5 bytes before those to be processed in the present CRC operation. The input timing of the 5th byte of the header part, that is, the HEC portion, is detected as the timing at which the derivation result and the result of the CRC operation for the data being processed are equivalent. The synchronization of a header part can thus be established.

Figure 7:
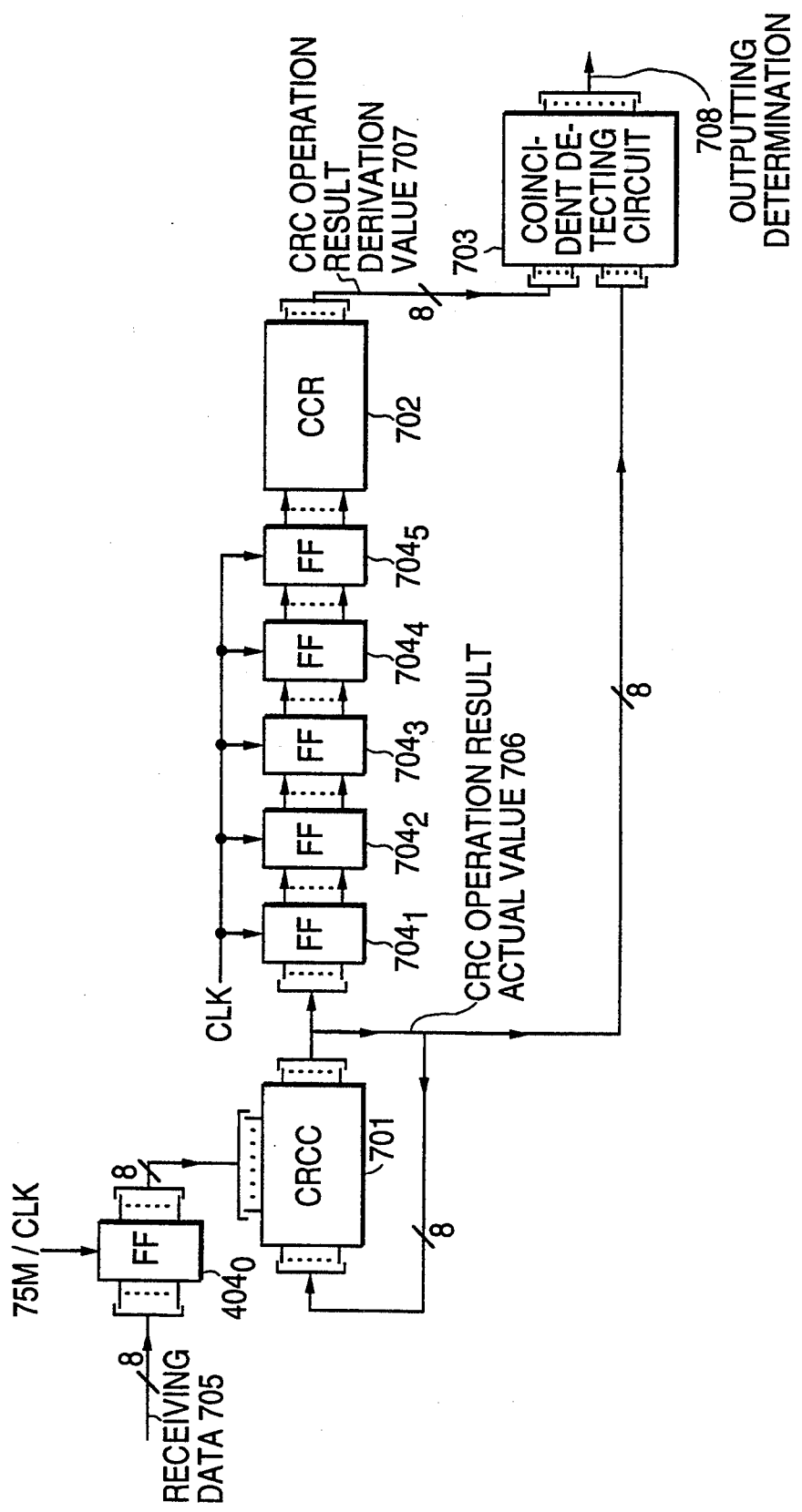
FIG. 7 shows a principle configuration for explaining the preferred embodiment of the HEC synchronizing circuit of the present invention.

FIG. 7 shows the principle for explaining the present preferred embodiment for realizing the above described operations. Receiving data 705 sequentially applied in a byte unit from an ATM transmission line 101 (FIG. 1) are temporarily stored in the FF$704_0$ and then applied to a CRC operating circuit (CRCC) 701.

The CRCC 701 performs for the receiving data 705 applied in a byte unit from the FF$704_0$ a CRC operation in which the above described receiving data 705 are divided by the generated polynomial $x^8+x^2+x+1$ using as an initial value a CRC operation result actual value 706 obtained in the previous CRC operation, and then it outputs as a remainder an 8-bit CRC operation result actual value 706.

The CRC operation result actual value 706 is delayed by 5 input timings by the five serially connected FF $704_1$–$704_5$, and applied to a CRC code correcting circuit ( CCR ) 702.

The CCR 702 outputs a value as an 8-bit CRC operation result derivation value 707 as if it were obtained as a result of a CRC operation performed for a 5-byte header part using as an initial value the CRC operation result actual value 706 outputted by the CRCC 701 5 input timings before the present process timing, that is, the initial value used in the CRCC 701 which is 4 input timings before the present process timing.

A coincidence detecting circuit 703 compares the 8-bit CRC operation result actual value 706 outputted by the CRCC 701 with an 8-bit CRC operation result derivation value 707 outputted by the CCR 702. If all corresponding bits of these values coincide, a determination output 708 indicating coincidence is outputted.

The FF $704_0$–$704_5$ operate according to a clock CLK synchronized with the input timing of the received data 705. In this case, if the transmission speed of the ATM transmission line 101 shown in FIG. 1 is 600 Mbps, for example, the input speed of a byte (8 bits) can be calculated as:

600/8=75 Mbps where 75 MHz indicates the clock frequency.

Figure 5:
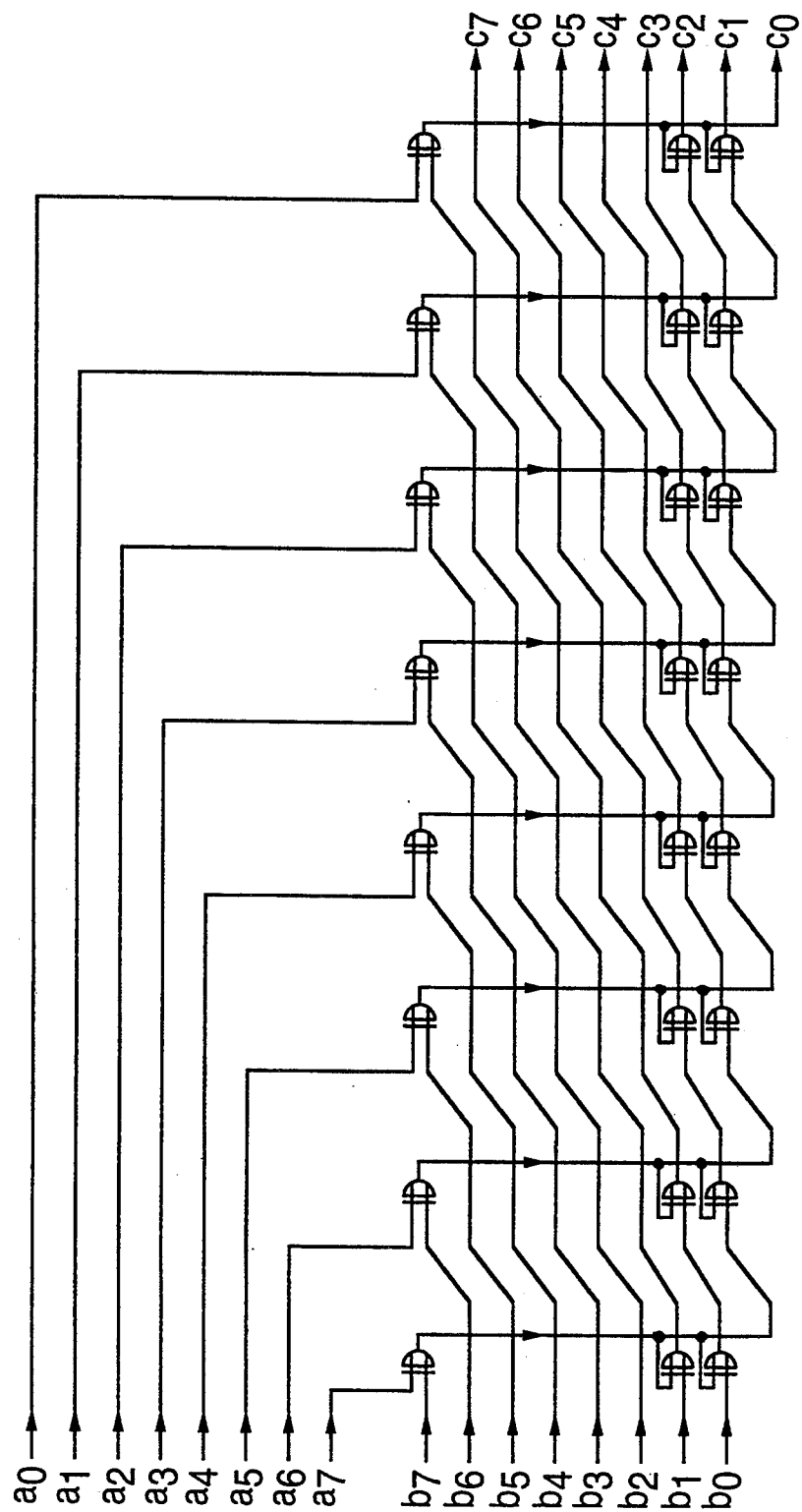
FIG. 5 (PRIOR ART) shows the circuit configuration of a CRCC.

In FIG. 7, the actual circuit configuration of the CRCC 701 is the same as that shown in FIG. 5 and described above in the prior art technology.

Figure 8:
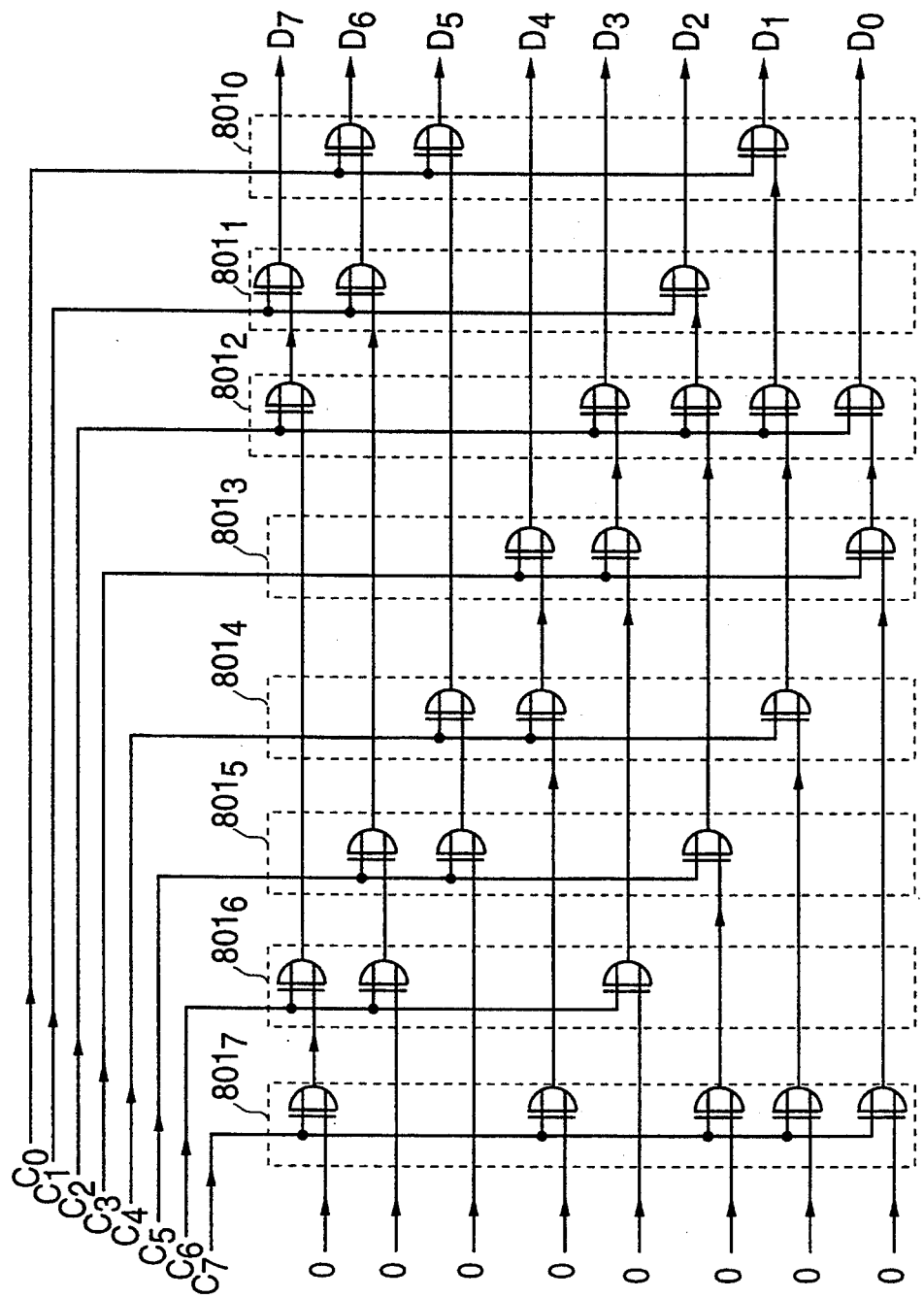
FIG. 8 shows the first example of a circuit configuration of a CCR.

Next, FIG. 8 shows the first typical configuration sample of a circuit. As shown in FIG. 8, the CCR 702 comprises a plurality of exclusive logical sum elements (EOR). Bit signals $c_0$–$c_7$ (MSB on the side of $c_7$) corresponds to each bit of the CRC operation result actual value 706 inputted to the FF $704_5$ shown in FIG. 7 and outputted from the CRCC 701 5 input timings before the present process timing, that is, each bit of the initial value in the CRCC 701 4 input timings before the present process timing. Bit signals $D_0$–$D_7$ correspond to each bit of the CRC operation result actual value 706 shown in FIG. 7.

Each of $801_0$–$801_7$ enclosed in dotted lines performs a conversion process indicated by (a)–(h) shown in FIG. 13. For example, the $801_0$ is a circuit unit for outputting "01100010" when the 0-th bit $c_0$ of an initial value indicates "1" and the 1st bit $c_1$ to the 7th bit $c_7$ indicate "0". An exclusive logical sum is sequentially obtained in a bit unit for each operation result shown in FIG. 13 by connecting each of the portions $801_0$–$801_7$ enclosed in dotted lines through an exclusive logical sum element as shown in FIG. 8. Basically, an exclusive logical sum element is applied to the bit position where "1" is outputted by a corresponding portion 801 enclosed in dotted lines according to FIG. 13. A byte data applied to the portion $801_7$ comprise all "0s" as shown in FIG. 8.

Figure 9:
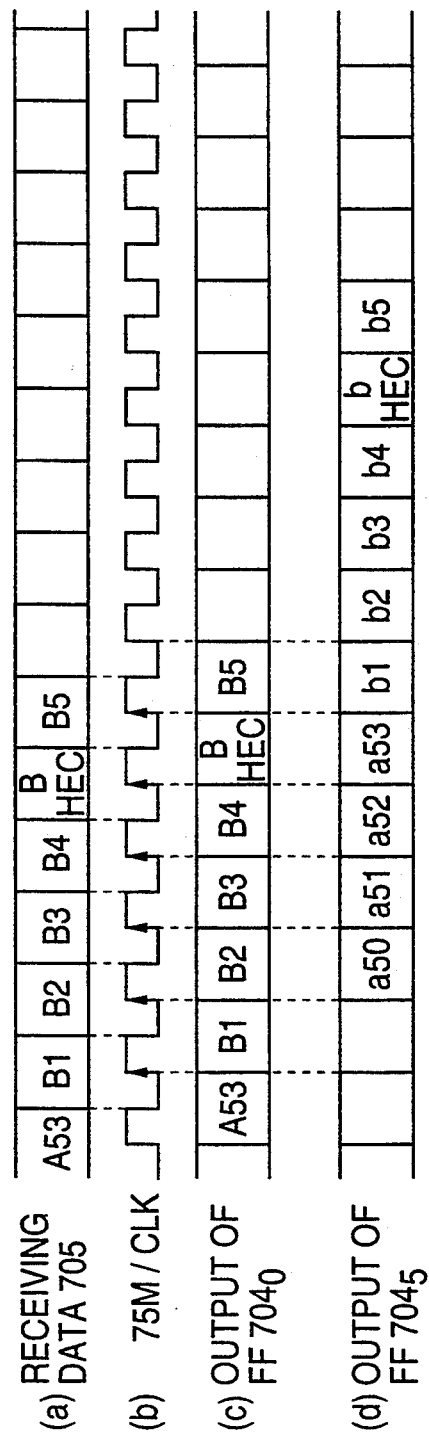
FIG. 9 is an operational timing chart for explaining the principle configuration of the preferred embodiment.

FIG. 9 shows an operational timing chart for explaining the principle configuration of the present preferred embodiment shown in FIGS. 5, 7, and 8. The receiving data 705 are entered in a byte unit as shown by (a) of FIG. 9 after synchronized with the clock CLK, having a frequency of 75 MHz, for example, as shown by (b) of FIG. 9. Then, the data are stored by the FF $704_0$ at the rise timing of the clock CLK, and the output is applied to the CRCC 701 at the timing shown by (c) of FIG. 9. At the same timing, the CRC operation result actual value 706 is outputted from the CRCC 701 to the coincidence detecting circuit 703. At the same timing again, the content of the CRC operation result derivation value 707 is outputted from the CCR 702, and it is a derivation value corresponding to the CRC operation result actual value 706 outputted from the CRCC 701 5 input timings before the present process timing as shown by (d) of FIG. 9. For example, by (c) of FIG. 9, the following values can be obtained at the timing at which the 5th byte of a header part, that is, the portion $B_{HEC}$ of the HEC, is applied to the CRCC 701. $a_{53}$ shown by (d) of FIG. 9 can be obtained from the FF $704_5$ as the CRC operation result actual value 706 at 5 inputs timing before the present process timing corresponding to $A_{53}$, that is, the 53rd byte (last byte) of the previous cell of the present cell. Also, the CRC operation result derivation value 707 corresponding to $a_{53}$ can be obtained from the CCR 702. If there are no errors in the data of the header part, a determination output 708 indicating coincidence is outputted by the coincidence detecting circuit 703.

As described above, in FIG. 4, five CRCCs 401 must be serially connected, while, in FIG. 7, only two circuits comprising one CRCC 701 and another CCR 702 of the same scale are required, and the circuit scale can thus be reduced.

Figure 10:
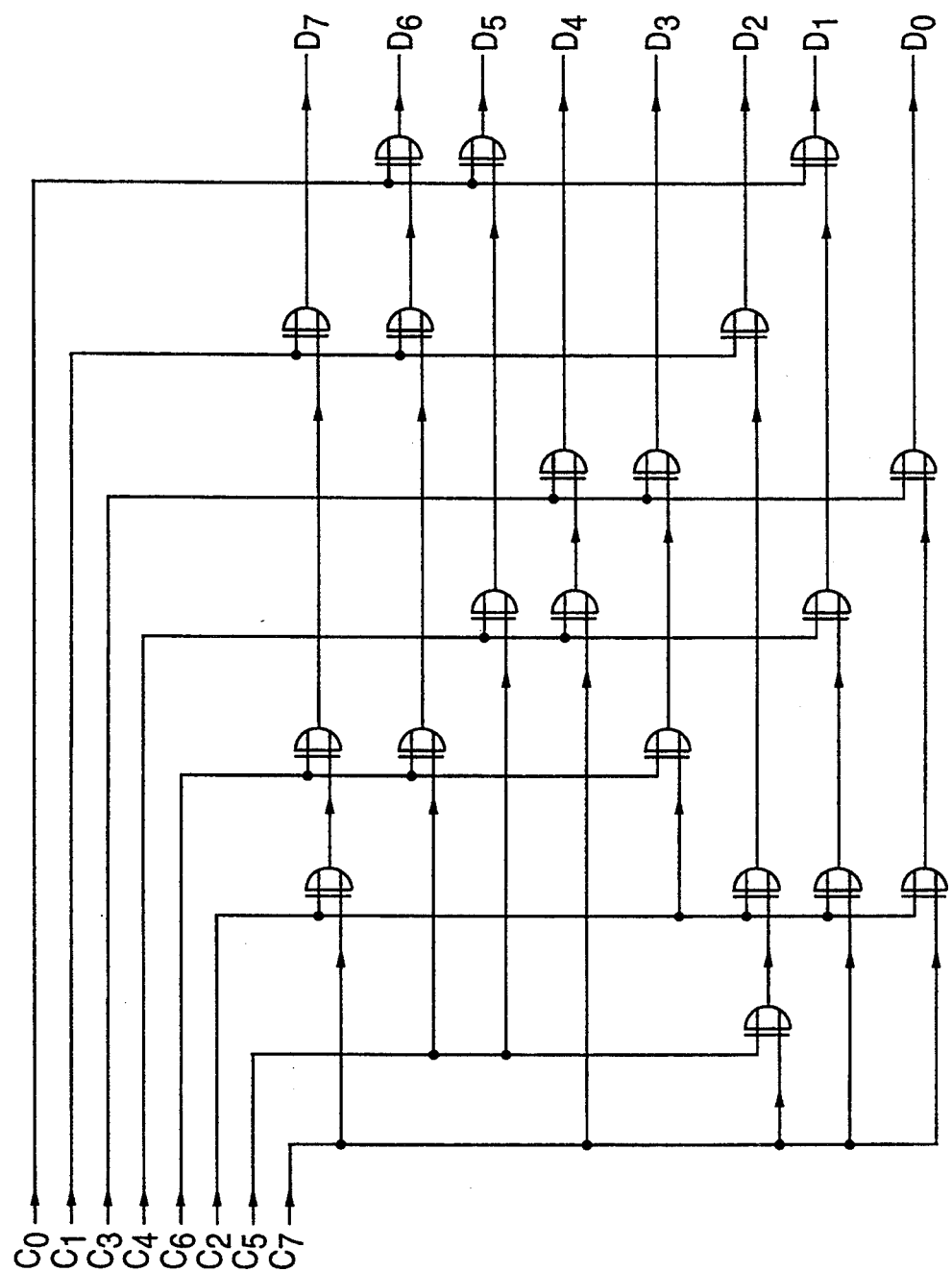
FIG. 10 shows the second example of a circuit configuration of a CCR.

Next, FIG. 10 shows the second example of a circuit configuration. In the above described first example of the circuit configuration shown in FIG. 8, the portions $801_0$–$801_7$ enclosed in broken lines can be connected in any order according to the characteristics of an exclusive logical sum. In the portion $801_7$ enclosed in broken lines, each exclusive logical sum element is omitted. At its bit position, five exclusive logical sum elements can be omitted if an initial value $c_7$ is directly applied to the next portion 801 enclosed in broken lines. Thus, as shown in FIG. 10, a CCR 702 can be configured with the smallest possible number of elements, and the circuit scale can thus be further reduced.

Figure 3:
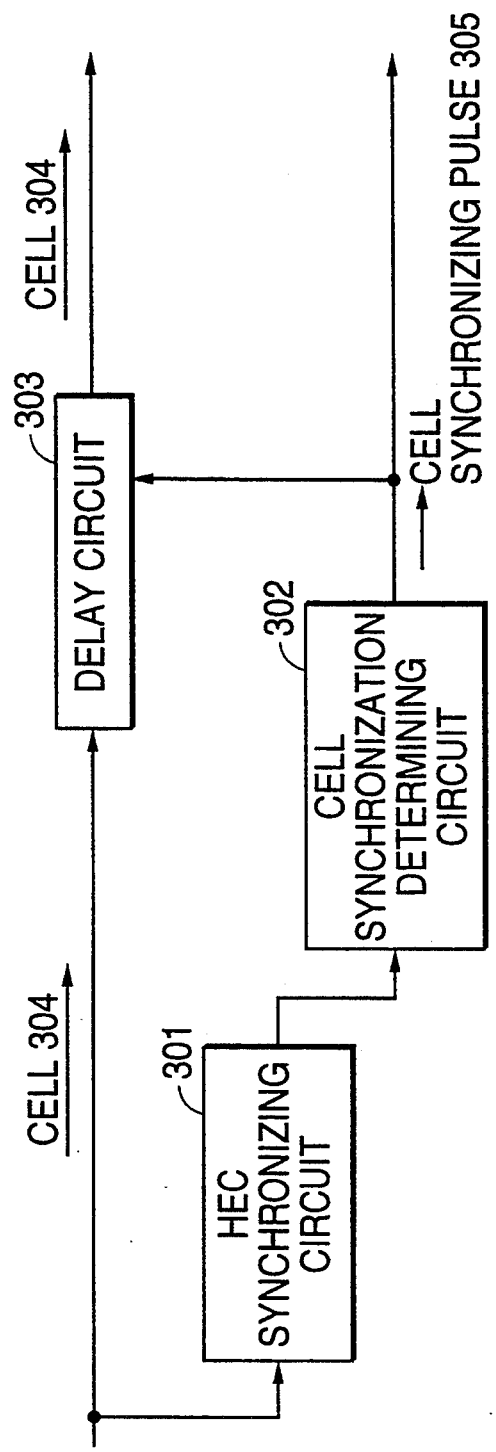
FIG. 3 (PRIOR ART) shows the configuration of the transmission terminal unit associated with the HEC synchronizing circuit.
Figure 11:
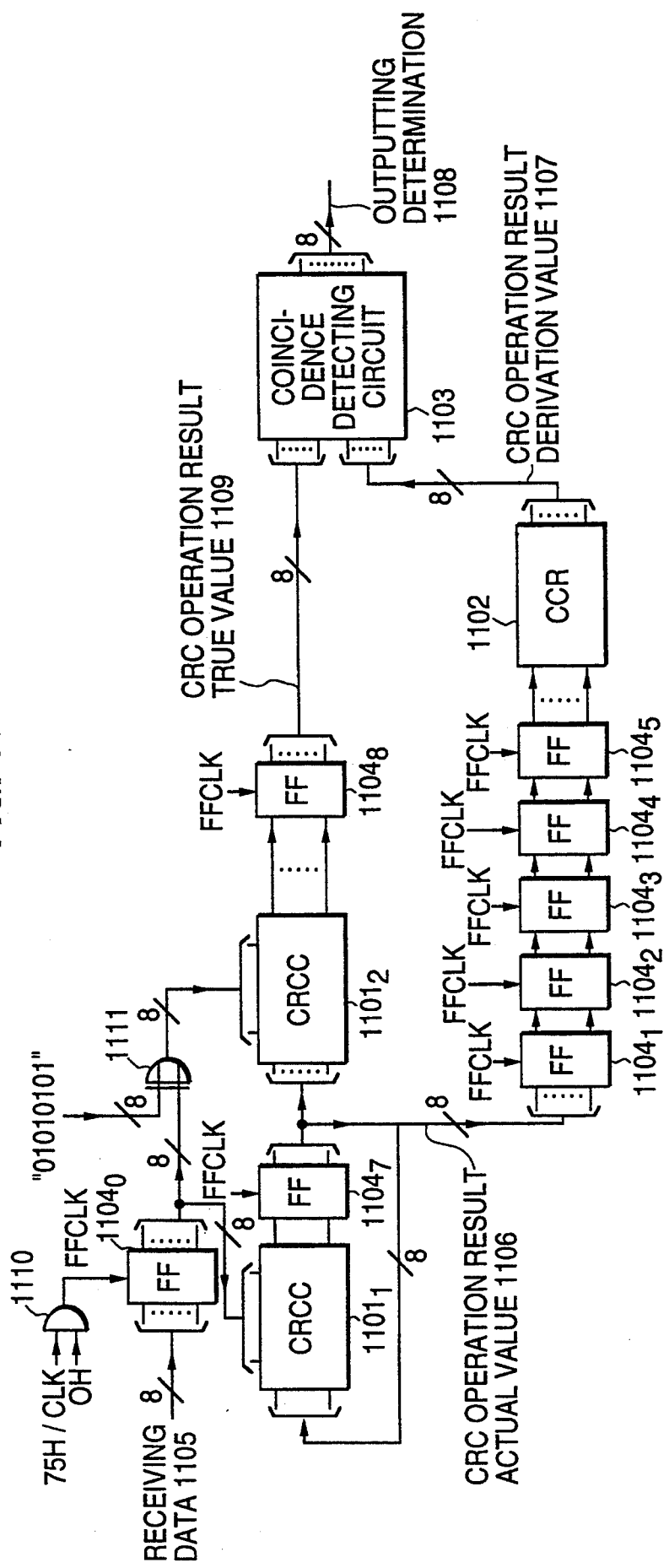
FIG. 11 shows a practical configuration for explaining the preferred embodiment of the HEC synchronizing circuit associated with the present invention.

FIG. 11 shows a practical configuration for explaining the preferred embodiment of the HEC synchronizing circuit 301 shown in FIG. 3 of the present invention. The basic configuration and operation are the same as those of FIG. 7. In FIG. 11, the CCR 1102 corresponds to the CCR 702 shown in FIG. 7; the coincidence detecting circuit 1103 corresponds to the circuit 703 shown in FIG. 7; the FFs $1104_0$–$1104_5$ correspond to the FFs $704_0$–$704_5$; the receiving data 1105 correspond to the data 705 shown in FIG. 7; the CRC operation result actual value 1106 corresponds to the value 706 shown in FIG. 7; the CRC operation result derivation value 1107 corresponds to the value 707 shown in FIG. 7; and the determination output 1108 corresponds to the output 708 shown in FIG. 7. The configuration of FIG. 11 differs from that of FIG. 7 in that it comprises only two CRCCs $1101_1$ and $1101_2$, two additional FFs $1104_7$ and $1104_8$ for retaining each output, an AND element 610, and an exclusive logical element 611. The configuration of the preferred embodiment shown in FIG. 11 follows the circuit configuration according to the CCITT recommendations.

According to the CCITT recommendations related to the ATM switching method, an exclusive logical sum is calculated with each bit of a CRC code obtained as a CRC operation result and each bit of a code called "coset" indicating "01010101", and the operation result is stored as an HEC in the header part of a cell according to the recommendations when on a sending side of a cell a CRC operation is performed for 4-byte header data and a 1-byte HEC is added to the data. Therefore, on the receiving side, an exclusive logical sum is calculated again for the HEC portion with the receiving data 1105 outputted by the FF $1104_0$ and the above described coset "01010101" to decode the original CRC code, and then perform a CRC operation. The exclusive logical sum element 611 and CRCC $1101_2$ shown in FIG. 11 are provided to perform the necessary processes involved. The exclusive logical sum element 611 is used as an element to obtain an exclusive logical sum for each bit using 1-byte (8-bit) receiving data 1105 provided by the FF $1104_0$ and 8-bit coset "01010101".

Figure 12:
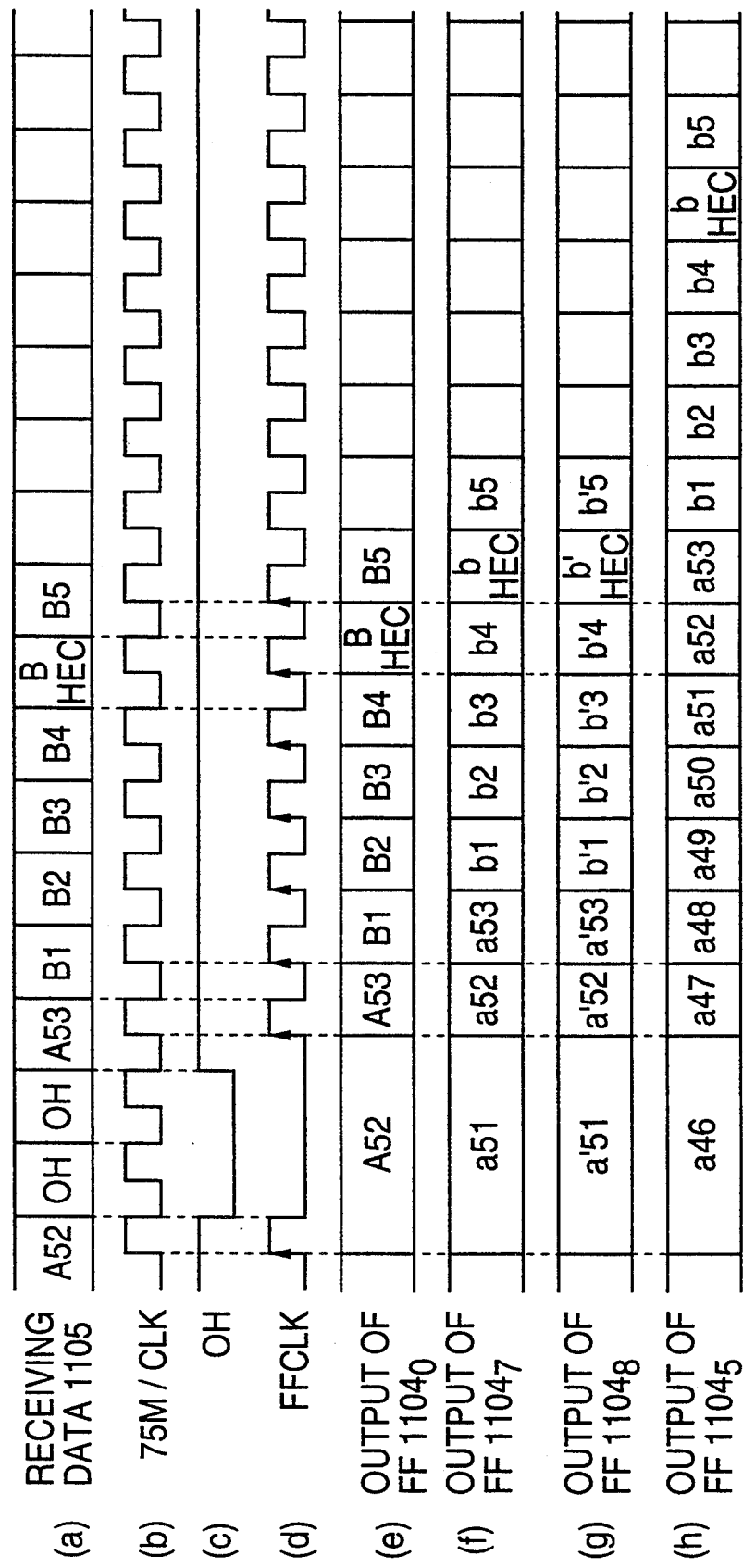
FIG. 12 is an operational timing chart for explaining an example of a practical configuration of the present invention.

FIG. 12 is an operational timing chart for explaining the practical configuration of the preferred embodiment shown in FIG. 11. For example, the 5th byte of a header part, that is, the HEC portion $B_{HEC}$, is outputted at the timing shown by (e) of FIG. 12. The exclusive logical sum element 611 subtracts a coset from the HEC data, and they are inputted to the CRCC $1101_2$. At the next timing at which a $b_{HEC}$ shown by (f) of FIG. 12 is outputted as a CRC operation result true value 1109 by the FF $1104_8$, an $a_{53}$ shown by (h) of FIG. 12 corresponding to $A_{53}$, the 53rd byte (last byte) and the previous cell of the present input cell, is obtained as a CRC operation result actual value 1106. At the same timing, a CRC operation result derivation value 1107 corresponding to the above described $a_{53}$ can be obtained by the CCR 1102. If no errors have arisen in the data of the header part, a determination output 1108 indicating a coincidence is outputted by the coincidence detecting circuit 1103.

As described above an appropriate process can be performed for an HEC provided with a coset.

The configuration shown in FIG. 11 differs from that shown in FIG. 7 in a clock for operating each FF 1104.

In the preferred embodiment shown in FIG. 11, a transmission method called SONET is used in the ATM transmission line 101 shown in FIG. 1. Therefore, in the preferred embodiment shown in FIG. 11, a signal component of a pulse OH indicating overhead of the SONET is subtracted from an AND element 610. The resultant clock FF CLK operates each FF 1104. In this configuration, as shown in (a) of FIG. 12, no FF 1104 continues its operation if the receiving data 1105 equals the overhead of the SONET.

As described above, in the practical configuration of the preferred embodiment shown in FIG. 11, an HEC synchronizing circuit 301 (FIG. 3) can be realized in conformity with the CCITT recommendations related to the ATM switching method.

What is claimed is:

1. A CRC operating method for determining whether or not data to be processed having a CRC code are applied in a predetermined data length unit, said method comprising steps of:

performing a CRC operation for conducting, using as an initial value a CRC operation result actual value obtained in a previous operation, a cyclic redundancy check operation for data to be processed after being inputted to said predetermined data length unit, said data to be processed being divided by a predetermined generated polynomial, and for outputting a CRC operation result actual value as a remainder, delaying said CRC operation result actual a value by an amount of time taken for a CRC code added to said data to be processed to be entered, and then outputting said delayed CRC operation result actual value, deriving a CRC operation result for outputting a value as a CRC operation result derivation value as if it were obtained as a result of a CRC operation performed for all the data to be processed having a CRC code of said data length, using as an initial value said CRC operation result actual value outputted after said delaying step, and detecting a coincidence by comparing a CRC operation result actual value outputted by said CRC operating step with a CRC operation result derivation value outputted by said CRC operation result deriving step, and by detecting according to said comparison result whether or not said data to be processed having no errors but having said CRC code of said predetermined data length unit, are entered.

2. A head error checker (HEC) synchronizing unit used in an asynchronous transfer mode (ATM) switching process for detecting errors in a header part of a cell having a CRC code and performing a cell synchronizing operation in the asynchronous transfer mode switching process, said HEC synchronizing unit comprising:

CRC operating means for performing a cyclic redundancy check operation in which received data of said cell inputted in a byte unit is divided by a predetermined generated polynomial, for outputting a corresponding CRC operation result actual value as a remainder, and for inputting into said operating means as an initial value said outputted CRC operation result actual value outputted in a previous said cyclic redundancy check operation, delay means for delaying said outputted operation result actual value by an amount of time taken for a header part of said received data to be inputted, CRC operation result deriving means for receiving as an initial value said delayed CRC operation result actual value outputted by said delay means and for generating a value as a CRC operation result derivation value as if it were obtained as a result of a CRC operation performed for all the received data of the header part based on said received initial value, and coincidence detecting means for comparing a CRC operation result actual value outputted by said CRC operating means with a CRC operation result derivation value generated by said CRC operation result deriving means, and for detecting an input timing of said received data, having no errors and having a header part provided with a CRC code of said data length, as coincident timing of both values.

3. The HEC synchronizing unit according to claim 2, wherein said CRC operation result deriving means includes a plurality of logical circuits for outputting a value as if it were obtained as a result of a CRC operation performed for all the received data of the header part using an initial value comprising only one bit value different from the others, each said logical circuit being provided corresponding to each said initial value from said delay mans having a different bit value at a different bit position, and each said logical circuit is connected to each other such that said CRC operation result derivation value can be obtained as an exclusive logical sum of outputs of said logical circuits each corresponding to an initial value which has a different bit value at a different bit position and derives said CRC operation result derivation value.

4. The HEC synchronizing unit according to claim 2, wherein said CRC code added to a header part can be obtained as an exclusive logical sum of a code obtained as a result of a CRC operation and coset data in the ATM switching process.

5. The HEC synchronizing unit according to claim 2, wherein said received data in a byte unit are inputted to a CRC operating unit at a timing other than that at which overhead of a SONET in the ATM switching process is inputted.

6. The HEC synchronizing unit according to claim 2, wherein said CRC operation result deriving means includes a plurality of logical circuits each receiving a corresponding bit of said CRC operation result actual value outputted by said delay mans and each being assigned data of a bit configuration in which only one bit of said bit configuration for each said logical circuit is different from that of the other said bit configurations, each of said plurality of logical circuits including a set of exclusive logical sum elements arranged at predetermined bit positions according to a bit configuration of data to be outputted by each said logical circuit, and each of said plurality of logical circuits being connected to each other through each bit of said bit configuration.

* * * * *

UNITED STATES PATENT AND TRADEMARK OFFICE
CERTIFICATE OF CORRECTION

PATENT NO. : 5,345,451
DATED : September 6, 1994
INVENTOR(S) : Uriu et al

It is certified that error appears in the above-indentified patent and that said Letters Patent is hereby corrected as shown below:

Column 3, line 68, delete "," and insert --.--.

Column 6, line 27, delete "4015" and insert --$401_5$--.

Column 8, line 21, delete "8017" and insert --$801_7$-- line 49, delete "a53" and insert --$^a53$--.

Column 10, line 30, delete "a".

Column 11, line 30, delete "mans" and insert --means--.

Column 12, line 22, delete "mans" and insert --means--.

Signed and Sealed this

Thirtieth Day of May, 1995

Attest:

BRUCE LEHMAN

Attesting Officer     Commissioner of Patents and Trademarks